US007021715B2

(12) United States Patent
Umezaki

(10) Patent No.: US 7,021,715 B2
(45) Date of Patent: Apr. 4, 2006

(54) RECLINER ADJUSTER FOR A SEAT

(75) Inventor: Kiyonori Umezaki, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 10/885,135

(22) Filed: Jul. 7, 2004

(65) Prior Publication Data

US 2006/0006718 A1    Jan. 12, 2006

(51) Int. Cl.
*B60N 2/20* (2006.01)
*B60N 2/235* (2006.01)

(52) U.S. Cl. ...................................... 297/367; 297/366

(58) Field of Classification Search ................ 297/367, 297/366
See application file for complete search history.

(56) References Cited

U.S. PATENT DOCUMENTS

| 5,873,630 | A | 2/1999 | Yoshida et al. ............. 297/367 |
|---|---|---|---|
| 6,024,410 | A * | 2/2000 | Yoshida .................. 297/367 X |
| 6,102,480 | A * | 8/2000 | Asano ......................... 297/366 |
| 6,318,805 | B1 * | 11/2001 | Asano ......................... 297/367 |
| 6,325,458 | B1 | 12/2001 | Rohee et al. ................ 297/367 |
| 6,722,738 | B1 * | 4/2004 | Uramichi .................... 297/367 |
| 6,758,525 | B1 * | 7/2004 | Uramichi .................... 297/366 |
| 6,769,740 | B1 * | 8/2004 | Yamada ....................... 297/366 |
| 6,786,550 | B1 * | 9/2004 | Uramichi .................... 297/366 |
| 6,820,937 | B1 * | 11/2004 | Esaki et al. .................. 297/366 |
| 2002/0017811 | A1 * | 2/2002 | Cilliere et al. ............... 297/367 |
| 2002/0043852 | A1 * | 4/2002 | Uramichi .................... 297/366 |
| 2002/0096923 | A1 * | 7/2002 | Uramichi .................... 297/366 |
| 2002/0096925 | A1 * | 7/2002 | Uramichi .................... 297/367 |
| 2003/0230923 | A1 * | 12/2003 | Uramichi .................... 297/367 |
| 2004/0150256 | A1 * | 8/2004 | Oki et al. .................... 297/367 |
| 2005/0073185 | A1 * | 4/2005 | Uramichi .................... 297/366 |

FOREIGN PATENT DOCUMENTS

| JP | 2000-245561 | 9/2000 |
|---|---|---|
| JP | 2000-342370 | 12/2000 |

OTHER PUBLICATIONS

Patent Abstracts of Japan, JP 8 214978 A, No. 12, Aug., 1996, 1 pg.
Patent Abstracts of Japan, JP 2000 245561 A, No. 12, Sep. 2000, 1 pg.

* cited by examiner

*Primary Examiner*—Rodney B. White
(74) *Attorney, Agent, or Firm*—Wenderoth, Lind & Ponack, L.L.P.

(57) ABSTRACT

A recliner adjuster for adjusting an inclination of a seat back with respect to a seat cushion includes a cam rotatably mounted between first and second brackets that are respectively fixed to the seat cushion and the seat back, a pair of lock plates interposed between the first and second brackets so as to move radially outwardly or inwardly with rotation of the cam, and a pair of auxiliary lock plates interposed between the first and second brackets. Each lock plate has an engaging portion having teeth formed on an outer edge thereof, and each auxiliary lock plate has teeth formed on an outer edge thereof and is slidable in a direction generally perpendicular to the direction in which the lock plates slide. When a large load has been applied to the seat back due to, for example, a vehicle collision, the teeth of the lock plates and those of the auxiliary lock plates are brought into engagement with internal teeth of the second bracket.

6 Claims, 9 Drawing Sheets

FRONT ←——→ REAR

FRONT ← → REAR

REARWARD INCLINATION

STANDARD POSITION

FRONTWARD INCLINATION

RECLINER ADJUSTER FOR A SEAT

BACKGROUND OF THE INVENTION

1. Field of the Invention

The present invention relates to a recliner adjuster attached to, for example, an automobile seat for appropriately adjusting the inclination of a seat back with respect to a seat cushion.

2. Description of the Related Art

Conventional reclining seats are provided with a recliner adjuster interposed between a seat cushion and a seat back hingedly connected to the seat cushion. The recliner adjuster includes a first bracket fixed to one of the seat cushion and the seat back and a second bracket fixed to the other of the seat cushion and the seat back and mounted on the first bracket so that one of the first and second brackets can rotate relative to the other.

The recliner adjuster also includes a cam interposed between the first and second brackets and fixed to a support shaft that is concentrically aligned with a center of rotation of one of the first and second brackets relative to the other. Rotation of the support shaft rotates the cam, which in turn causes a lock plate to slide radially outwardly or inwardly between the first and second brackets. The first bracket has a radially extending guide groove having opposite parallel side walls. The lock plate has teeth formed on the outer periphery thereof and is slidably disposed within the guide groove.

On the other hand, the second bracket has internal teeth concentrically formed around the center of rotation referred to above. When the lock plate slides radially outwardly along the guide groove upon rotation of the cam together with the support shaft, the teeth of the lock plate are brought into engagement with the internal teeth of the second bracket, resulting in locking of the first and second brackets. Reverse rotation of the cam releases the engagement of the teeth of the lock plate with the internal teeth of the second bracket, thus allowing one of the first and second brackets to rotate relative to the other.

Accordingly, when an operating rod connected to the support shaft is operated, the teeth of the lock plate engage with the internal teeth of the second bracket to retain the inclination of the seat back, or the teeth of the lock plate disengage from the internal teeth of the second bracket so that the inclination of the seat back can be changed as desired (see, for example, Japanese Laid-Open Patent Publication No. 2000-342370).

Furthermore, another recliner adjuster has been proposed wherein a plurality of lock plates that are operable to slide in the radial direction by rotation of a cam are provided at predetermined intervals, and an auxiliary lock plate is interposed between two adjacent lock plates. According to this recliner adjuster, when a large load has been applied to the seat back, teeth of the auxiliary lock plate engage with internal teeth to withstand the large load that may be caused by, for example, a collision of an automotive vehicle (see, for example, Japanese Laid-Open Patent Publication No. 2000-245561).

In the conventional recliner adjuster as disclosed in Japanese Laid-Open Patent Publication No. 2000-342370, a large load applied to the seat back presses the lock plate against a side wall of the guide groove and occasionally causes deformation of the side wall, which in turn causes inclination of the lock plate and lowers the engagement between the teeth of the lock plate and the internal teeth, thus lowering the locking strength.

On the other hand, the recliner adjuster as disclosed in Japanese Laid-Open Patent Publication No. 2000-245561 includes a plurality of stoppers each interposed between one of the lock plates and one of the auxiliary lock plates adjacent thereto. The stoppers act to hold the auxiliary lock plates at respective predetermined positions under normal conditions and engage the auxiliary lock plates with the internal teeth when a large load has been inputted. Because this recliner adjuster is provided with a lot of movable members, the number of manufacturing or assembling processes increases and there is still a room for improvement in reliability.

SUMMARY OF THE INVENTION

The present invention has been developed to overcome the above-described disadvantages.

It is accordingly an objective of the present invention to provide a recliner adjuster having a reduced number of movable members and a sufficient locking strength capable of withstanding a large load.

In accomplishing the above and other objectives, the recliner adjuster according to the present invention includes a first bracket to be fixed to the seat cushion, a second bracket to be fixed to the seat back so as to confront the first bracket, and a cam rotatably mounted between the first and second brackets. A pair of lock plates are interposed between the first and second brackets so as to move radially outwardly or inwardly with rotation of the cam. Each lock plate has an engaging portion that has teeth formed on an outer edge thereof and also has first and second shoulder portions formed on respective sides of the engaging portion. The first bracket has a plurality of guide members that define a pair of first guide grooves and a pair of second guide grooves. The engaging portion of each lock plate is slidably received in one of the first guide grooves. The second bracket has a recess defined therein in which the plurality of guide members are received and also has internal teeth that are brought into engagement with the teeth of the engaging portion of each lock plate when the lock plate moves radially outwardly with the engaging portion thereof guided by one of the first guide grooves of the first bracket. A pair of auxiliary lock plates are interposed between the first and second brackets, and each of them has teeth formed on an outer edge thereof and is received in one of the second guide grooves.

By this construction, when a large load has been applied to the seat back to the extent that the lock plates incline, the inclined lock plates slide the auxiliary lock plates outwardly to engage the teeth of the auxiliary lock plates with the internal teeth of the second bracket. Accordingly, a recliner adjuster having a sufficient locking strength capable of withstanding such a large load can be provided with a reduced number of movable members.

Conveniently, the direction in which the auxiliary lock plates slide is so set as to be generally perpendicular to the direction in which the lock plates slide.

Advantageously, the lock plates have respective leg portions that are held in sliding contact with inner edges of the auxiliary lock plates. When the load applied to the seat back inclines the lock plates, the leg portions of the lock plates presses the auxiliary lock plates outwardly.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

Figure 1:
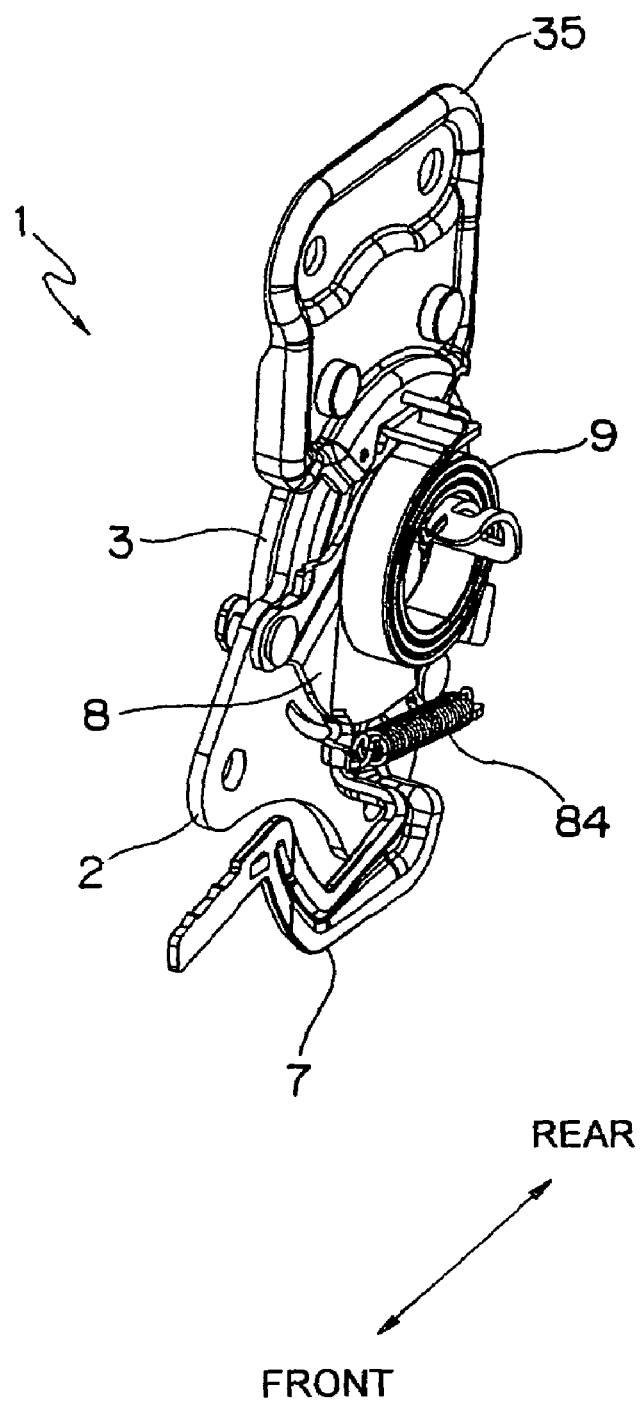
FIG. 1 is a perspective view of a recliner adjuster according to the present invention.
Figure 2:
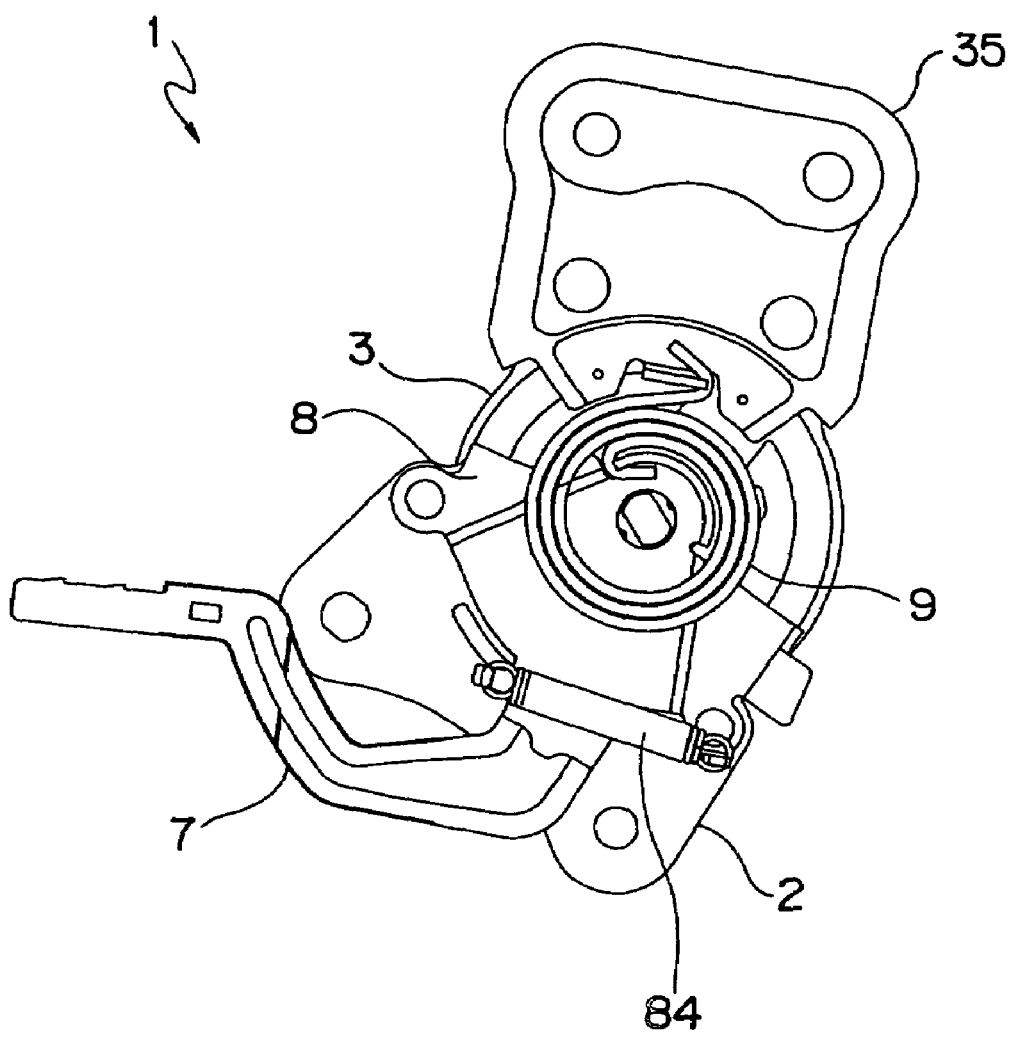
FIG. 2 is a front view of the recliner adjuster of FIG. 1.
Figure 3:
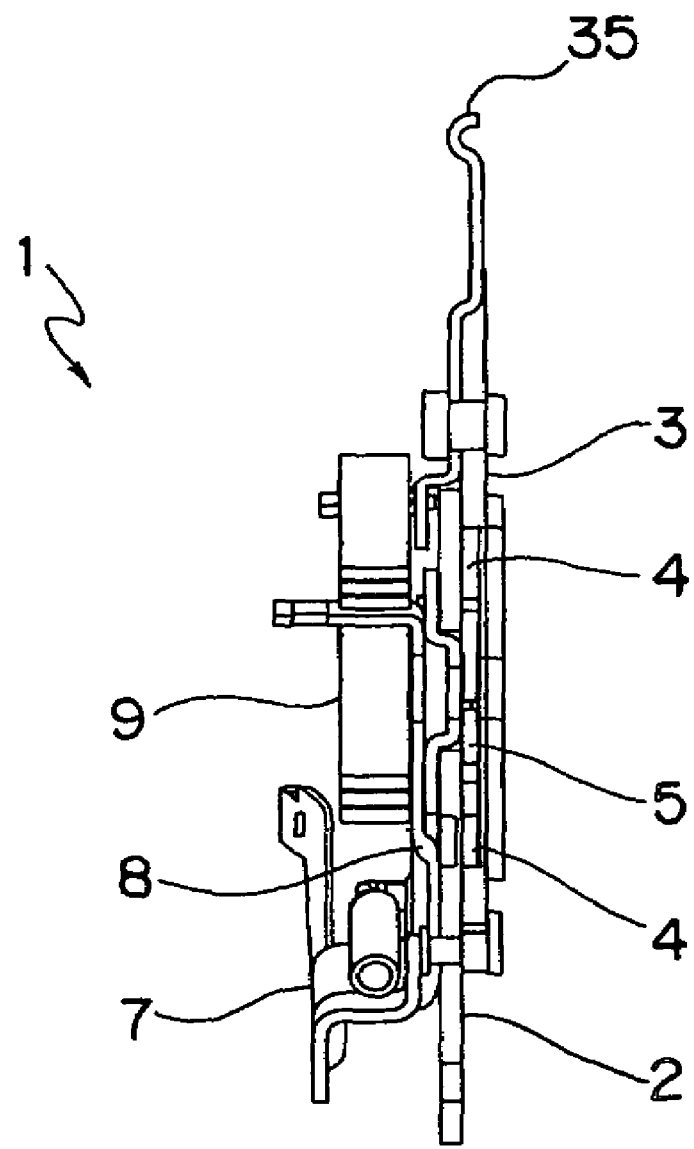
FIG. 3 is a side view of the recliner adjuster of FIG. 1.

This application is based on an application No. 2003-38390 filed Feb. 17, 2003 in Japan, the content of which is herein expressly incorporated by reference in its entirety.

Referring now to the drawings, there is shown in FIGS. 1 to 4 a recliner adjuster according to the present invention, which is mounted on, for example, an automobile seat on respective sides thereof to retain a seat back at a desired angle with respect to a seat cushion while allowing the seat back to incline.

The recliner adjuster 1 includes a first bracket 2 to be fixed to the seat cushion (not shown), a second bracket 3 to be fixed to the seat back (not shown) so as to confront the first bracket 2, a pair of lock plates 4 interposed between the first and second brackets 2, 3, a cam 5 interposed between the first and second brackets 2, 3 to slide the lock plates 4 radially outwardly or inwardly, an operating lever 7 for rotating the cam 5, and a retaining plate 8 for retaining the operating lever 7 such that the operating lever 7 can rotate about a center of rotation of the cam 5.

The first bracket 2 has a generally round upper portion having a center hole 21 define therein in which an engaging portion 7a of the operating lever 7 that is formed by press working to engage with the cam 5 is received. The first bracket 2 also has a pair of (front and rear) guide members 22 protruding inwardly toward the second bracket 3 at each of upper and lower portions thereof. These guide members 22 are configured in a point-symmetric relationship with respect to the center hole 21.

The first bracket 2 has a generally round upper portion having a center hole 21 defined therein in which an engaging portion 7a of the operating lever 7 that is formed by press working to engage with the cam 5 is received. The first bracket 2 also has a pair of (front and rear) guide members 22 protruding inwardly toward the second bracket 3 at each of upper and lower portions thereof. These guide members 22 are configured in a point-symmetric relationship with respect to the center hole 21.

Figure 4:
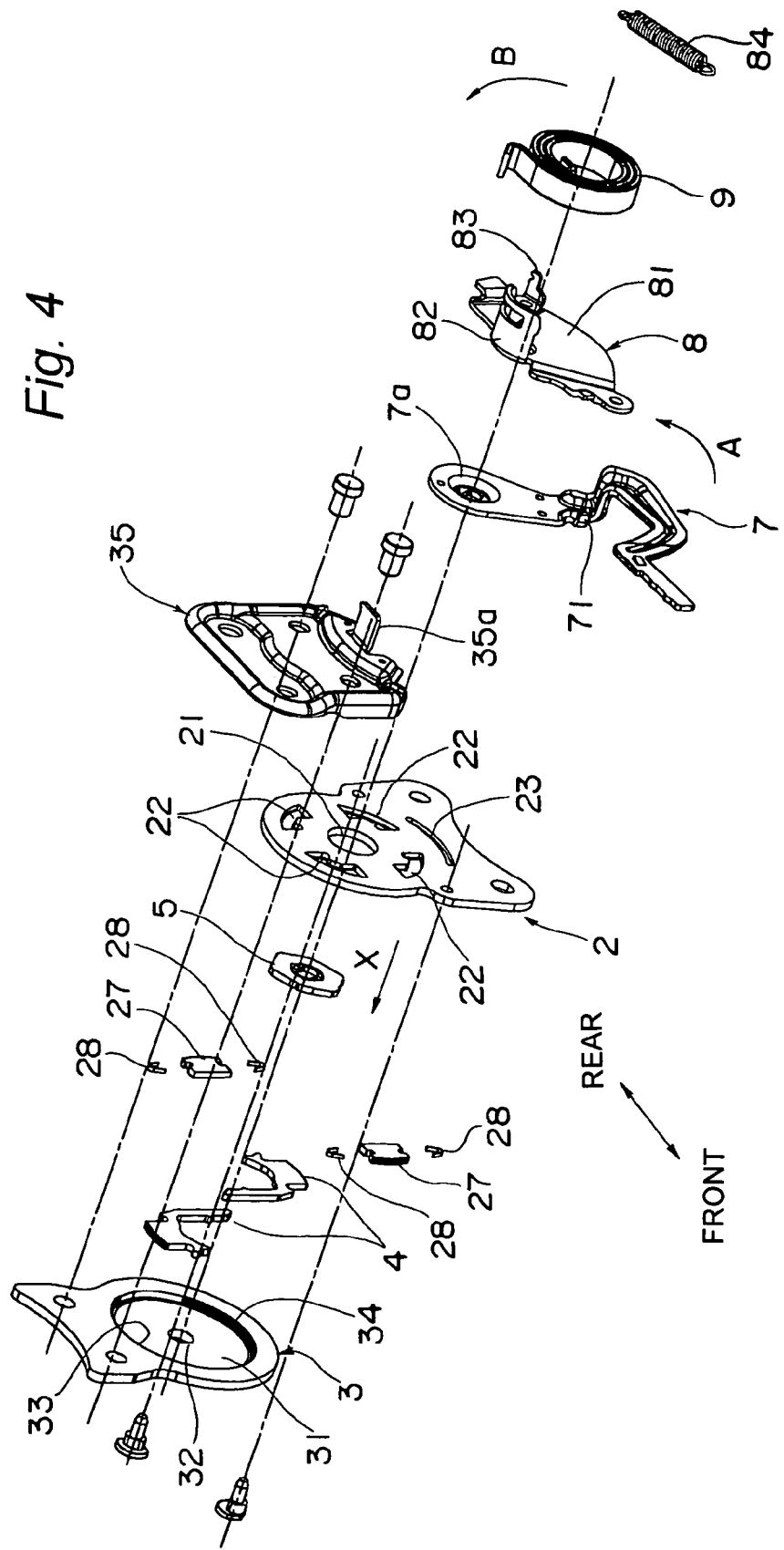
FIG. 4 is an exploded perspective view of the recliner adjuster of FIG. 1.
Figure 5:
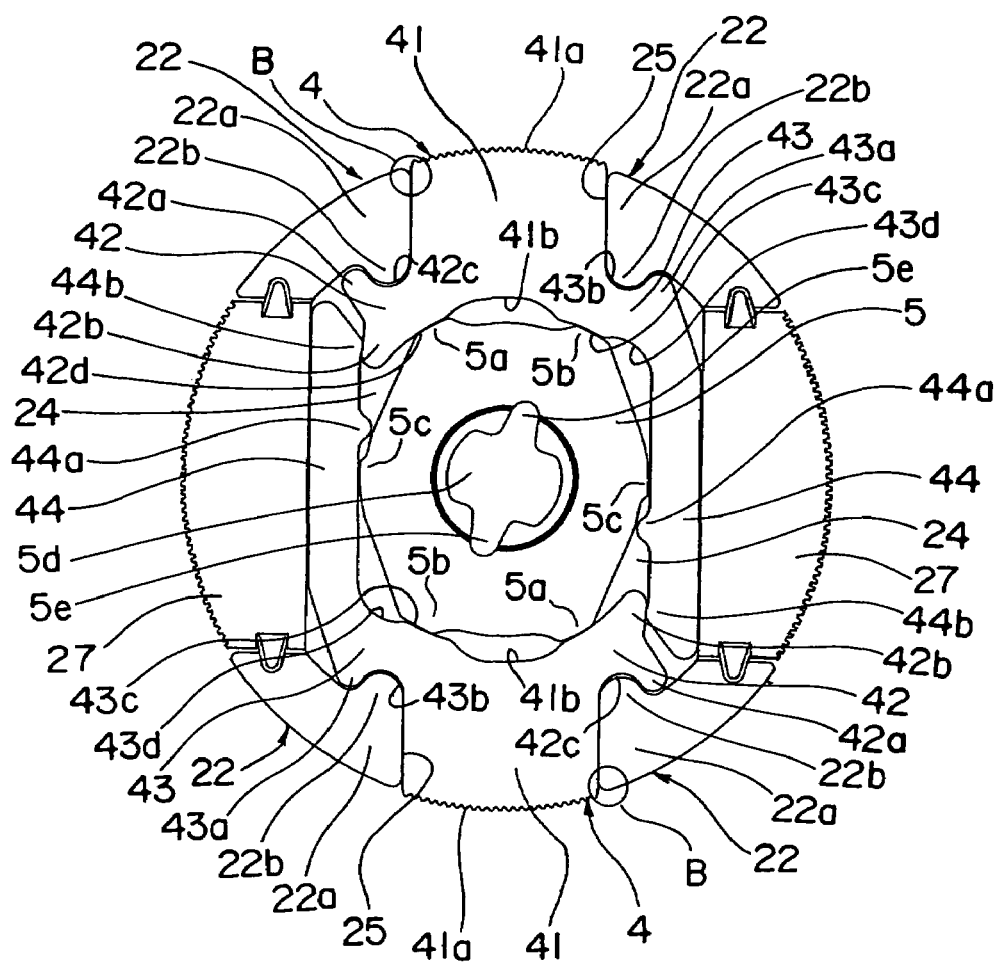
FIG. 5 is a view obtained by superposing guide members of a first bracket on a view of a pair of lock plates and a cam as viewed from the direction of an arrow X in FIG. 4.
Figure 6:
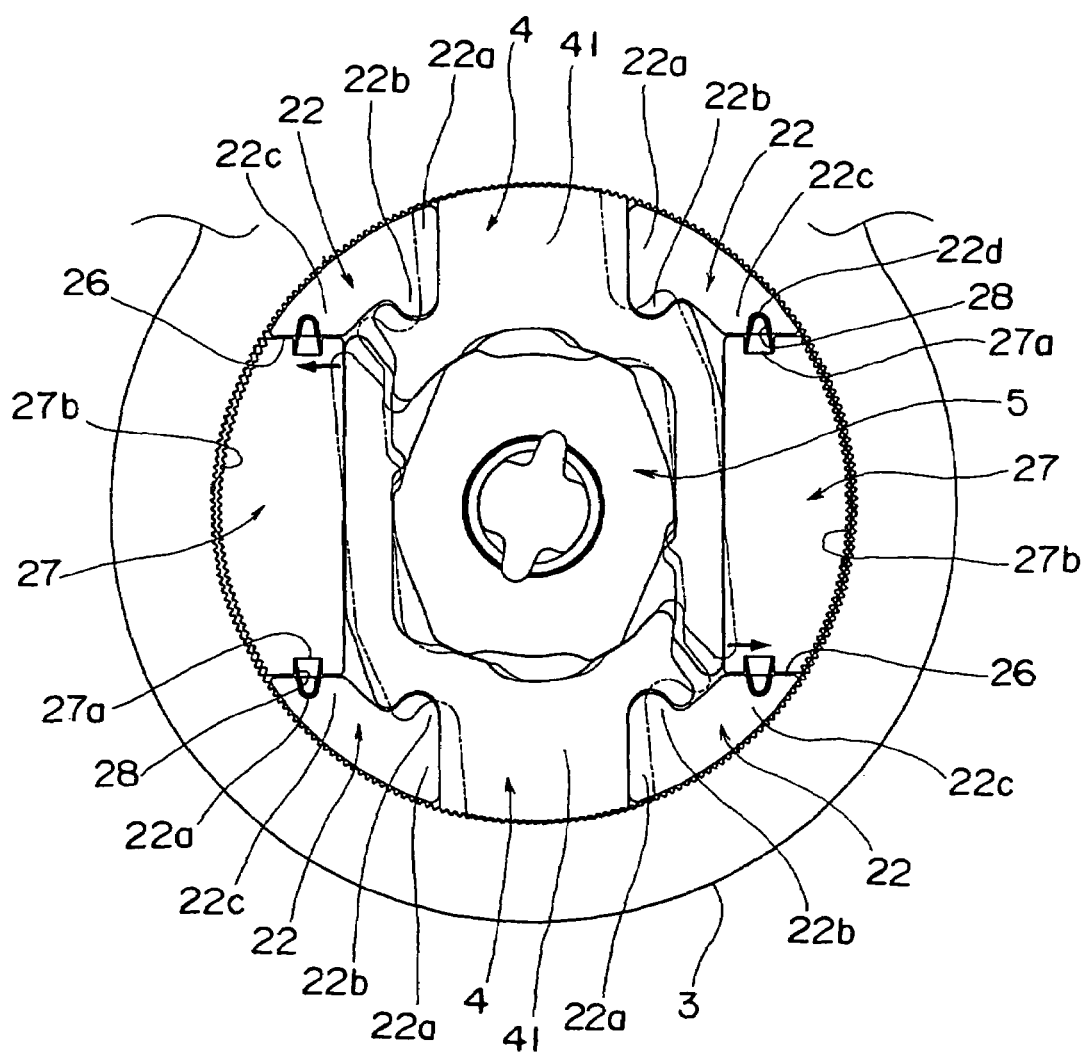
FIG. 6 is a view similar to FIG. 5, but depicting a state at which the lock plate has been inclined by a large frontward load applied to a seat back, as shown by a double-dotted chain line.

FIGS. 5 and 6 are views obtained by superposing the guide members 22 of the first bracket 2 on a view of the lock plates 4 and the cam 5 as viewed from the direction of an arrow X in FIG. 4. Each of the four guide members 22 has a first guide portion 22a confronting the lock plate 4. Mutually confronting first guide portions 22a define a first guide groove 25 therebetween in which a portion (an engaging portion 41 described later) of one of the lock plates 4 is slidably received. Each first guide portion 22a has an engaging projection 22b formed radially inwardly thereof to engage with a portion of one of the lock plates 4 as explained later.

On each of the front and rear portions of the recliner adjuster 1, two vertically separated guide members 22 have respective second guide portions 22c at locations confronting each other to define a second guide groove 26 therebetween. An auxiliary lock plate 27 is received within the second guide groove 26 so as to be held in sliding contact with opposite side walls thereof. The second guide portion 22c of each guide member 22 and a portion of the auxiliary lock plate 27 opposed thereto have respective recesses 22d, 27a, in which a generally V-shaped spring 28 is accommodated. Each auxiliary lock plate 27 has teeth 27b formed on an outer periphery thereof to engage with internal teeth 34 of the second bracket 3 as occasion demands.

As shown in FIG. 4, the second bracket 3 has a generally round lower portion and an upper mounting portion. The second bracket 3 also has a round projection 31 formed in the generally round lower portion by press working so as to protrude outwardly in the direction away from the first bracket 2. The round projection 31 has a center hole 32 defined at the center thereof in alignment with the center hole 21 of the first bracket 2.

The round projection 31 has a round recess 33 defined on a side thereof (right-hand side in FIG. 4) confronting the first bracket 2. The round recess 33 has a radius slightly greater than the radius of curvature of the outer periphery of the guide members 22. When the first and second brackets 2, 3 are mated with each other, the guide members 22 are received in the round recess 33 with a clearance defined between the outer periphery of the guide members 22 and a ring-shaped side wall of the round recess 33. The ring-shaped side wall of the round recess 33 has internal teeth 34 formed on the entire inner periphery thereof so as to confront the teeth 41a of the lock plates 4 and those 27b of the auxiliary lock plates 27.

The second bracket 3 has front and rear mounting holes defined therein adjacent to an upper edge thereof, and a third bracket 35 employed as a retainer plate for retaining the first bracket 2 on the second bracket 3 is bolted to the mounting holes in the second bracket 3. The third bracket 35 is fixed to the seat back. Under the condition in which the first bracket 2 is mated with the second bracket 3, when the third bracket 35 is fixed to the second bracket 3, the third bracket 35 acts to hold the upper portion of the first bracket 2 while allowing rotation of the first bracket 2. By so doing, separation of the upper portion of the first bracket 2 from the second bracket 3 is avoided.

Furthermore, the first bracket 2 has front and rear mounting holes defined therein adjacent to a lower edge thereof, and the first bracket 2 is bolted to the seat cushion via these mounting holes.

As shown in FIG. 5, each lock plate 4 has an engaging portion 41 vertically slidably received in one of the guide grooves 25 in the first bracket 2, first and second shoulder portions 42, 43 integrally formed with the engaging portion 41 on respective sides thereof, and a leg portion 44 integrally formed with the second shoulder portion 43 so as to extend therefrom toward the first shoulder portion 42 of the other lock plate 4. The engaging portion 41 has teeth 41a formed on the outer edge thereof for engagement with the internal teeth 34 of the second bracket 3. Under the condition in which the guide members 22 are received in the round recess 33 in the second bracket 3, rotation of one of the first and second brackets 2, 3 relative to the other is prevented by the engagement of the teeth 41a of the engaging portion 41 with the internal teeth 34 of the second bracket 3. The leg portion 44 has a straight outer edge held in sliding contact with a straight inner edge of one of the auxiliary lock plates 27 and a generally straight inner edge held in sliding contact with the outer periphery of the cam 5 accommodated in a space encircled by the pair of lock plates 4.

The length of the leg portion 44 is determined such that each lock plate 4 accommodated in the space 24 delimited by the guide members 22 and the auxiliary lock plates 27 can move between an engaging position, where upon radially outward movement of the lock plate 4 the engaging portion 41 is held in engagement with the internal teeth 34 of the second bracket 3, and an engagement release position where upon radially inward movement of the lock plate 4 the engagement of the engaging portion 41 with the internal teeth 34 of the second bracket 3 is released. More specifically, the distance between the engaging position and the engagement release position is so set as to be slightly greater than the tooth depth of the teeth 41a. Thus, when the lock plate 4 moves radially outwardly, the teeth 41a of the engaging portion 41 are brought into engagement with the internal teeth 34 of the second bracket 3, and when the lock plate 4 moves radially inwardly toward the center hole 21, the engagement of the teeth 41a of the engaging portion 41 with the internal teeth 34 of the second bracket 3 is released.

The first shoulder portion 42 of each lock plate 4 has a first engaging projection 42a formed at a radially outward portion thereof that is brought into contact with the engaging projection 22b of the guide member 22 opposed thereto, and also has a second engaging projection 42b formed at a radially inward portion thereof that is brought into contact with an inner edge of a distal end of the leg portion 44 of the other lock plate 4. A first recess 42c into which the engaging projection 22b of the guide member 22 is introduced is formed between the engaging portion 41 and the first engaging projection 42a. The first recess 42c has a shape complementary to the shape of the engaging projection 22b of the guide member 22. The second shoulder portion 43 of each lock plate 4 has a first engaging projection 43a formed at a radially outward portion thereof that is brought into contact with the engaging projection 22b of the guide member 22 opposed thereto. A first recess 43b into which the engaging projection 22b of the guide member 22 is introduced is formed between the engaging portion 41 and the first engaging projection 43a. The first recess 43b has a shape complementary to the shape of the engaging projection 22b of the guide member 22. The leg portion 44 has a first engaging projection 44a integrally formed therewith on the inner edge thereof that is brought into contact with the cam 5, and also has a second engaging projection 44b integrally formed therewith on the inner edge of the distal end thereof that is brought into contact with the second engaging projection 42b of the first shoulder portion 42 of the other lock plate 4.

Figure 7:
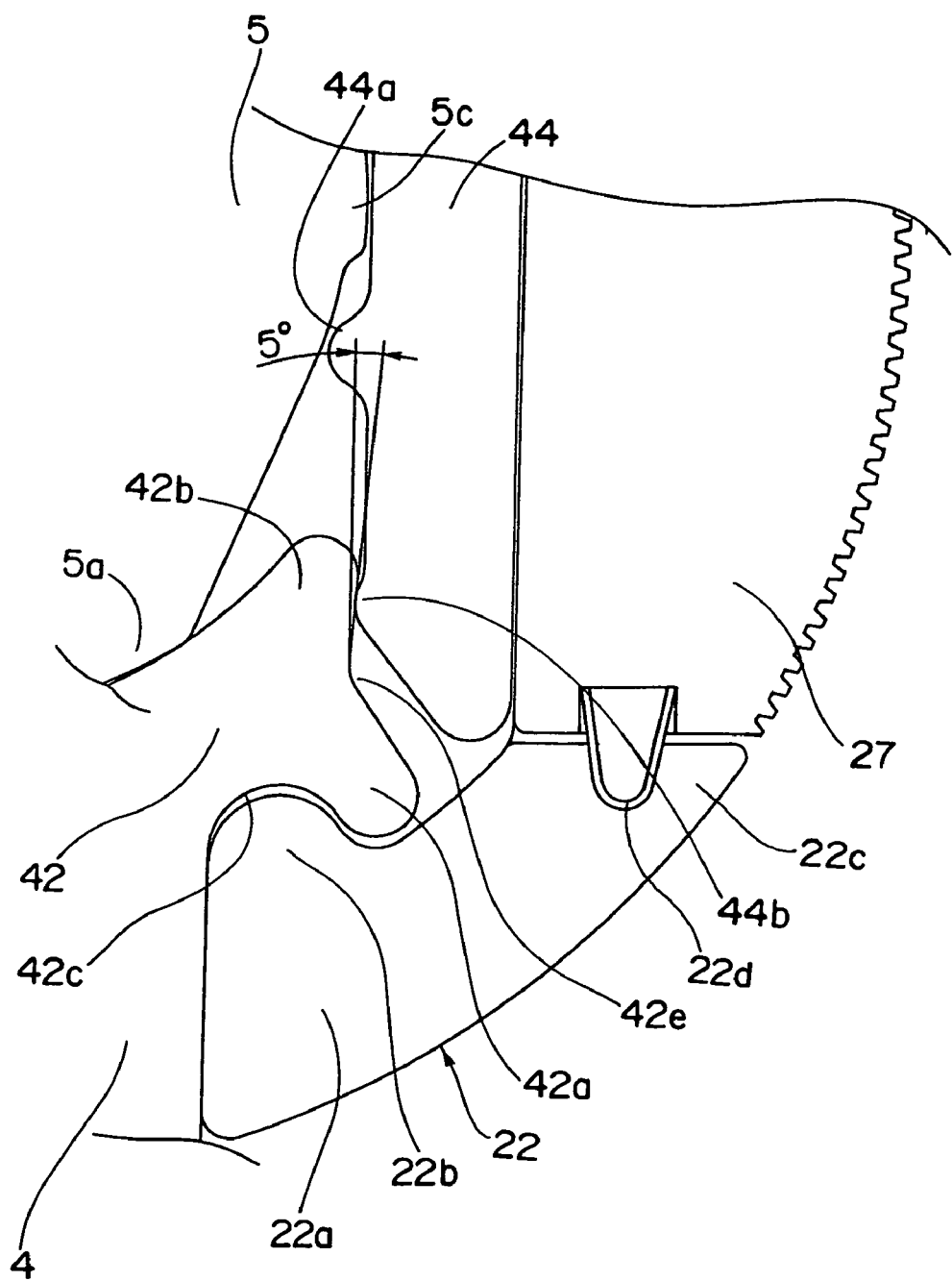
FIG. 7 is a partial view, on an enlarged scale, of a contact portion between the pair of lock plates.

FIG. 7 is an enlarged view of a contact portion between the second engaging projection 44b of the leg portion 44 of one of the lock plates 4 and the second engaging projection 42b of the first shoulder portion 42 of the other of the lock plates 4.

As shown in FIG. 7, a second recess 42e is formed between the first and second engaging projections 42a, 42b of the first shoulder portion 42. The second engaging projection 42b has an inclined side surface confronting the leg portion 44 of the other lock plate 4. The angle of inclination (the angle with respect to the sliding direction of the leg portion 44) of the inclined side surface depends on the size of the recliner adjuster 1 or the clearance between the lock plate 4 and the guide members 22, and is set to, for example, 50, as shown in FIG. 7.

The cam 5 is generally hexagonal and has three corners confronting one of the lock plates 4 and three other corners confronting the other of the lock plates 4. The three corners confronting one of the lock plates 4 act as a first projection 5a that is brought into contact with an inclined inner surface 42d of the first shoulder portion 42, a second projection 5b that is brought into contact with a second engaging projection 43c formed on the inner surface of the second shoulder portion 43, and a third projection 5c that is brought into contact with the first engaging projection 44a of the leg portion 44, respectively. The three other corners confronting the other of the lock plates 4 similarly act as a first projection 5a that is brought into contact with an inclined inner surface 42d of the first shoulder portion 42 of such lock plate 4, a second projection 5b that is brought into contact with a second engaging projection 43c formed on the inner surface of the second shoulder portion 43, and a third projection 5c that is brought into contact with the first engaging projection 44a of the leg portion 44, respectively.

The cam 5 has an elongated opening 5d defined therein at the center thereof and two cut-outs 5e formed on opposite sides of a minor axis of the elongated opening 5d. The operating lever 7 has two pins (not shown) integrally formed therewith on a surface (convex surface on the left-hand side in FIG. 4) of the engaging portion 7a. The cam 5 is connected to the operating lever 7 by introducing the engaging portion 7a of the operating lever 7 into the center hole 21 of the first bracket 2 and introducing the two pins into the cut-outs 5e of the cam 5, respectively.

The retaining plate 8 for retaining the operating lever 7 is mounted on the first bracket 2 to ensure that the operating lever 7 can be smoothly operated on the first bracket 2. As shown in FIG. 4, the retaining plate 8 has a plate body 81 for holding the operating lever 7, an arcuated plate 82 integrally formed with the plate body 81 on an upper edge thereof so as to extend outwardly therefrom, and a spring latch 83 integrally formed with the plate body 81 at a rear end of a lower edge thereof so as to extend outwardly therefrom.

The operating lever 7 also has a spring latch 71 integrally formed therewith at an intermediate portion thereof so as to extend outwardly therefrom. A coil spring 84 is tensioned between the spring latch 71 of the operating lever 7 and the spring latch 83 of the retaining plate 8 to bias the operating lever 7 in the direction of an arrow A.

The third bracket 35 has a spring latch 35a integrally formed therewith so as to extend outwardly (rightward in FIG. 4) therefrom. A spiral spring 9 is hooked at one end thereof to the spring latch 35a of the third bracket 35 and at the other end thereof to a front edge of the arcuated plate 82 of the retaining plate 8. The spiral spring 9 acts to bias the second bracket 3 in the direction of an arrow B via the third bracket 35, thereby biasing the seat back frontward via the second bracket 3.

The recliner adjuster of the above-described construction operates as follows.

In a normal condition in which the operating lever 7 is not operated, the operating lever 7 is biased in the direction of the arrow A by a biasing force of the coil spring 84 and, hence, the cam 5 connected to the operating lever 7 is similarly biased in the direction of the arrow A.

In this condition, as shown in FIG. 5, the first and second projections 5a, 5b of the cam 5 are held in contact with the inclined inner surface 42d and the second engaging projection 43c of each lock plate 4, respectively, and the second engaging projection 42b of the first shoulder portion 42 of the lock plate 4 is held in contact with the second engaging projection 44b of the leg portion 44 of the other lock plate 4. Accordingly, each lock plate 4 is biased radially outwardly while being held in a predetermined posture (an inclined posture as described later). At this moment, the teeth 41a of the lock plate 4 protrude radially outwardly from the guide groove 25 and are held in engagement with the internal teeth 34 of the second bracket 3 and, hence, the position of the second bracket 3 relative to the first bracket 2 or the inclination of the seat back relative to the seat cushion is held at a predetermined position or a predetermined angle, respectively.

At this moment, each auxiliary lock plate 27 is held at the engagement release position by means of the V-shaped spring 28, and the teeth 27b of the auxiliary lock plate 27 are disengaged from the internal teeth 34 of the second bracket 3.

In this condition, when a grip of the operating lever 7 is lifted against the biasing force of the coil spring 84, the cam 5 rotates in the direction counter to the arrow A. As a result, the first projection 5a of the cam 5 is introduced into a first recess 41b formed between the inclined inner surface 42d and the second engaging projection 43c of the lock plate 4, while the second projection 5b of the cam 5 is introduced into a second recess 43d formed on the inner side of the second shoulder portion 43 of the lock plate 4. Furthermore, the third projection 5c of the cam 5 is brought into contact with and pushes the first engaging projection 44a of the leg portion 44 of the lock plate 4. Thus, the engaging portion 41 of the lock plate 4 slides radially inwardly along the guide groove 25, the engagement of the teeth 41a with the internal teeth 34 of the second bracket 3 is released, and the lock plate 4 moves from the engaging position to the engagement release position. Accordingly, the posture (inclination) of the seat back relative to the seat cushion can be changed as desired.

After the posture of the seat back relative to the seat cushion has been determined, when the hand is released from the grip of the operating lever 7, the biasing force of the coil spring 84 rotates the cam 5 in the direction of the arrow A, which in turn slides the lock plate 4 radially outwardly, thereby engaging the teeth 41a of the lock plate 4 with the internal teeth 34 of the second bracket 3 and holding the seat back in a newly set posture.

When the lock plate 4 is at the engagement release position, the second engaging projection 44b formed on the inner edge of the distal end of the leg portion 44 is accommodated in the second recess 42e formed at an end portion of the first shoulder portion 42 of the other lock plate 4. As the lock plate 4 moves from the engagement release position to the engaging position, the second engaging projection 44b moves away from the second recess 42 such that the second engaging projection 44b is brought into contact with the second engaging projection 42b of the first shoulder portion 42 opposed thereto and is held in sliding contact with the inclined side surface of the second engaging projection 42b.

Accordingly, an outer surface of the distal end of the leg portion 44 of the lock plate 4 is gradually pressed against the auxiliary lock plate 27. At the engaging position where the angle of inclination of the seat back relative to the seat cushion is maintained at a desired one, the lock plate 4 inclines slightly and the distal end of the leg portion 44 is sandwiched between the first shoulder portion 42 of the lock plate 4 and the auxiliary lock plate 27 opposed thereto. At this moment, the first engaging projection 43a of the second shoulder portion 43 is brought into contact with a side wall of the guide member 22, while a side wall of the distal end of the engaging portion 41 on the side of the first shoulder portion 42 is brought into contact with a side wall of the first guide portion 22a of the other guide member 22 at a portion B in FIG. 5. As a result, the clearances at the sliding portions of the lock plate 4, the guide members 22 and the like are reduced, thereby reducing looseness of the lock plate 4.

It is to be noted here that the internal teeth 34 of the second bracket 3 and the teeth 41a of the lock plates 4 are configured so that they may be held in complete engagement with each other under the condition in which the lock plates 4 have inclined at the engaging position.

Figure 8C:
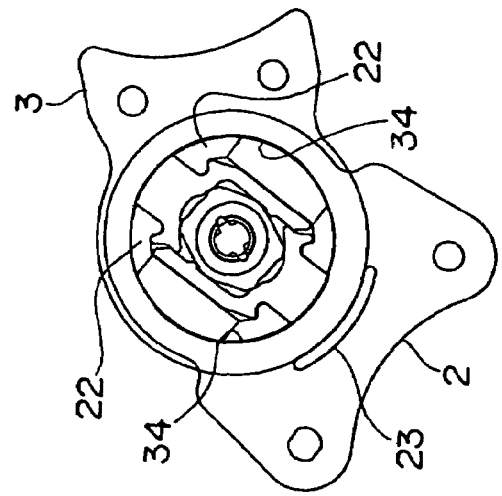
FIGS. 8A, 8B and 8C are schematic views showing rotation of a second bracket relative to the first bracket, FIG. 8A depicting a state at which the seat back has been inclined to the front limit, FIG. 8B depicting a standard state at which the recliner adjuster according to the present invention has been designed, and FIG. 8C depicting a state at which the seat back has been inclined to the rear limit.
Figure 8B:
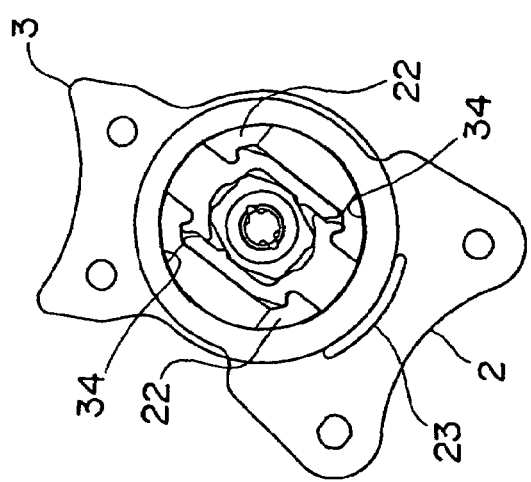
Figure 8A:
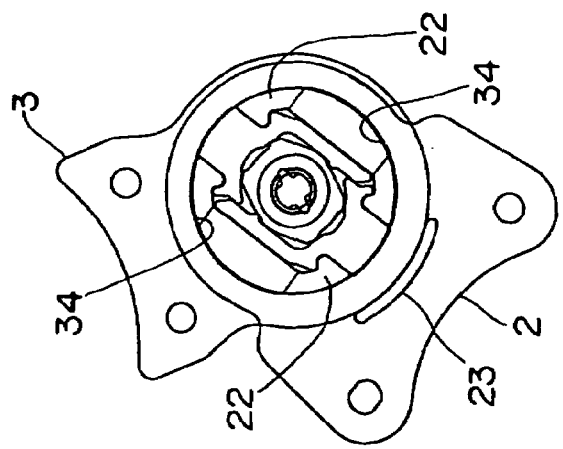

FIGS. 8A, 8B and 8C are schematic views showing rotation of the second bracket 3 relative to the first bracket 2. In particular, FIG. 8A shows a state at which the seat back has been inclined to the front limit, FIG. 8B shows a standard state at which the recliner adjuster 1 according to the present invention has been designed, and FIG. 8C shows a state at which the seat back has been inclined to the rear limit.

As described hereinabove, the arcuated auxiliary guide member 23 is held in sliding contact with the outer periphery of the generally round lower portion of the second bracket 3, while the outer peripheries of the guide members 22 of the first bracket 2 are held in sliding contact with the inner periphery of the round recess 33 in the second bracket 3. Accordingly, relative rotation of the first and second brackets 2, 3 is smoothly carried out by setting gaps (clearances) at the sliding portions to respective desired values. That is, the sliding portions act as a position regulating means for regulating the radial position of the second bracket 3 relative to the first bracket 2.

As can be seen from FIGS. 8A, 8B and 8C, throughout a range of the front limit to the rear limit of the seat back, the radial position of the second bracket 3 relative to the first bracket 2 is regulated by the position regulating means referred to above in a plurality of different directions. Thus, compared with the conventional recliner adjusters, looseness between the first and second brackets 2, 3 is reduced, resulting in a reduction in looseness of the seat back relative to the seat cushion.

Moreover, under the condition in which the teeth 41a of the lock plate 4 are held in engagement with the internal teeth 34 of the second bracket 3, when a frontward load less than a predetermined value has been applied to the seat back, a side edge of the engaging portion 41 of the lock plate 4 on the side of the first shoulder portion 42 is pressed against a side edge of the first guide groove 25 (an end surface of the first guide portion 22a of the guide member 22 opposed thereto) and the surface pressures of both of them increase to withstand the load. When a frontward load greater than the predetermined value has been applied to the seat back, not only the side edge of the engaging portion 41 of the lock plate 4 on the side of the first shoulder portion 42 is pressed against the side edge of the first guide groove 25 (the end surface of the first guide portion 22a of the guide member 22 opposed thereto), but also the first engaging projection 43a integral with the second shoulder portion 43 of the lock plate 4 is pressed against the engaging projection 22b integral with the first guide portion 22a of the guide member 22 opposed thereto. As a result, the surface pressures of the mating portions increase to withstand the load.

On the other hand, under the condition in which the teeth 41a of the lock plate 4 are held in engagement with the internal teeth 34 of the second bracket 3, when a rearward load less than a predetermined value has been applied to the seat back, a side edge of the engaging portion 41 of the lock plate 4 on the side of the second shoulder portion 43 is pressed against a side edge of the first guide groove 25 (an end surface of the first guide portion 22a of the guide member 22 opposed thereto) and the surface pressures of both of them increase to withstand the load. When a rearward load greater than the predetermined value has been applied to the seat back, not only the side edge of the engaging portion 41 of the lock plate 4 on the side of the second shoulder portion 43 is pressed against the side edge of the first guide groove 25 (the end surface of the first guide portion 22a of the guide member 22 opposed thereto), but also the first engaging projection 42a integral with the first shoulder portion 42 of the lock plate 4 is pressed against the engaging projection 22b integral with the first guide portion 22a of the guide member 22 opposed thereto. As a result, the surface pressures of the mating portions increase to withstand the load.

That is, where a frontward or rearward load applied to the seat back is less than the predetermined value, contact between the engaging portion 41 of the lock plate 4 and the side edge of the first guide groove 25 withstands the load, and where a frontward or rearward load applied to the seat back is greater than the predetermined value, contact between the engaging portion 41 of the lock plate 4 and the side edge of the first guide groove 25 withstands the load first and, upon subsequent deformation of a portion of the lock plate 4 or the guide member 22, contact between the first or second shoulder portion 42, 43 of the lock plate 4 and the first guide portion 22a of the guide member 22 further withstands the load.

Figure 9B:
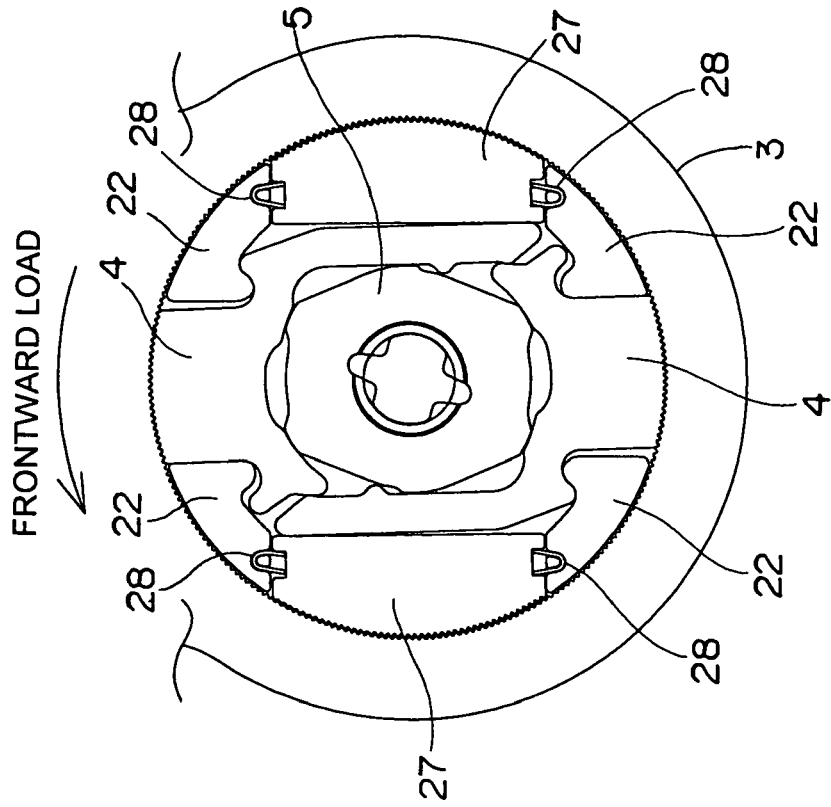
FIGS. 9A and 9B are views similar to FIG. 5, FIG. 9A depicting a normal locking condition and FIG. 9B depicting a locking condition when a large load has been inputted.
Figure 9A:
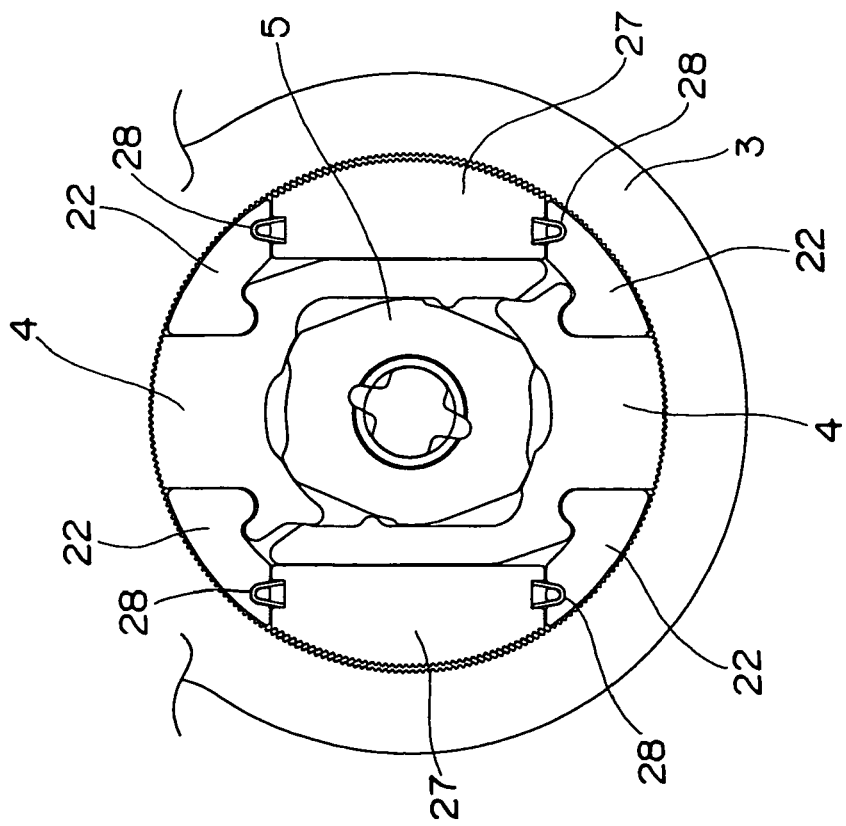

In addition, as shown by a solid line in FIG. 6 or as shown in FIG. 9A, under the condition in which the teeth 41a of the lock plate 4 are held in engagement with the internal teeth 34 of the second bracket 3, when a frontward load much greater than the predetermined value has been applied to the seat back due to, for example, a vehicle collision and presses the side edge of the engaging portion 41 of the lock plate 4 on the side of the first shoulder portion 42 against the side edge of the first guide groove 25 to thereby cause deformation of the guide member 22, the lock plate 4 inclines as shown by a double-dotted chain line in FIG. 6 or as shown in FIG. 9B. As a result, the distal end of the leg portion 44 of the lock plate 4 presses a portion of the auxiliary lock plate 27 opposed thereto outwardly in a direction generally perpendicular to the sliding direction of the lock plate 4, and the auxiliary lock plate 27 slides outwardly along the second guide groove 26 against an elastic force of the V-shaped spring 28 (an arrow in FIG. 6), resulting in engagement of the teeth 27b of the auxiliary lock plate 27 with the internal teeth 34 of the second bracket 3.

That is, even when the lock plate 4 inclines and engagement thereof with the internal teeth 34 of the second bracket 3 has come loose, the teeth 27b of the auxiliary lock plate 27 are brought into engagement with the internal teeth 34 of the second bracket 3, making it possible to ensure the desired locking strength.

On the other hand, under the condition in which the teeth 41a of the lock plate 4 are held in engagement with the internal teeth 34 of the second bracket 3, when a rearward load much greater than the predetermined value has been applied to the seat back due to, for example, a vehicle collision and presses the side edge of the engaging portion 41 of the lock plate 4 on the side of the second shoulder portion 43 against the side edge of the first guide groove 25 to thereby cause deformation of the guide member 22, the lock plate 4 inclines in a direction counter to the direction as shown by the double-dotted chain line in FIG. 6 or as shown in FIG. 9B. As a result, the root (a portion adjacent to the second shoulder portion 43) of the leg portion 44 of the lock plate 4 presses a portion of the auxiliary lock plate 27 opposed thereto outwardly, and the auxiliary lock plate 27 slides outwardly along the second guide groove 26 against the elastic force of the V-shaped spring 28, resulting in engagement of the teeth 27b of the auxiliary lock plate 27 with the internal teeth 34 of the second bracket 3.

Accordingly, as in the case where a large frontward load has been applied to the seat back, even when the lock plate 4 inclines and engagement thereof with the internal teeth 34 of the second bracket 3 has come loose, the teeth 27b of the auxiliary lock plate 27 are brought into engagement with the internal teeth 34 of the second bracket 3, making it possible to ensure the desired locking strength.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for a seat for adjusting an inclination of a seat back with respect to a seat cushion, comprising:
    a first bracket to be fixed to the seat cushion;
    a second bracket to be fixed to the seat back so as to confront the first bracket;
    a cam rotatably mounted between the first and second brackets;
    a pair of lock plates interposed between the first and second brackets so as to move radially outwardly or inwardly with rotation of the cam, each lock plate having an engaging portion that has teeth formed on an outer edge thereof and also having first and second shoulder portions formed on respective sides of the engaging portion;
    the first bracket having a plurality of guide members that define therebetween a pair of first guide grooves and a pair of second guide grooves, the engaging portion of each lock plate being slidably received in one of the first guide grooves;
    the second bracket having a recess defined therein in which the plurality of guide members are received and also having internal teeth that are brought into engagement with the teeth of the engaging portion of each lock plate when the lock plate moves radially outwardly with the engaging portion thereof guided by one of the first guide grooves of the first bracket; and
    a pair of auxiliary lock plates interposed between the first and second brackets, each auxiliary lock plate having teeth formed on an outer edge thereof and being slidably received in and slidably guided by one of the second guide grooves;

wherein when a load applied to the second bracket inclines the lock plates, the lock plates slide the auxiliary lock plates outwardly in said second guide grooves to engage the teeth of the auxiliary lock plates with the internal teeth of the second bracket.

2. The recliner adjuster according to claim 1, wherein a direction in which the auxiliary lock plates slide is generally perpendicular to a direction in which the lock plates slide.

3. The recliner adjuster according to claim 1, wherein the lock plates have respective leg portions that are held in sliding contact with inner edges of the auxiliary lock plates and wherein when the load applied to the second bracket inclines the lock plates, the leg portions of the lock plates press the auxiliary lock plates outwardly.

4. The recliner adjuster according to claim 3, wherein said lock plates and said auxiliary lock plates are arranged such that when a load applied to the second bracket causes inclination of said lock plate in a first rotary direction, distal end portions of said leg portions of said lock plates press said auxiliary lock plates so that said auxiliary lock plates slide outwardly in said second guide grooves to engage the teeth of the auxiliary lock plates with the internal teeth of said second bracket, and such that when a load applied to the second bracket causes inclination of said lock plate in a second rotary direction opposite said first rotary direction, root end portions opposite said distal end portions of said leg portions of said lock plates press said auxiliary lock plates so that said auxiliary lock plates slide outwardly in said second guide grooves to engage the teeth of the auxiliary lock plates with the internal teeth of said second bracket.

5. The recliner adjuster according to claim 3, wherein said leg portions of said lock plates extend from said second shoulder portions, respectively, of said lock plates; and for each one of said lock plates, said first shoulder portion engages with a distal end portion of said leg portion of the other of said lock plates.

6. The recliner adjuster according to claim 1, wherein said second grooves extend in a direction that is generally perpendicular to a direction in which said first grooves extend.

* * * * *